F. T. GALLAGHER.
AUTOMATIC QUICK ACTING AIR BRAKE.
APPLICATION FILED FEB. 28, 1914.

1,276,640.

Patented Aug. 20, 1918.
12 SHEETS—SHEET 2.

F. T. GALLAGHER.
AUTOMATIC QUICK ACTING AIR BRAKE.
APPLICATION FILED FEB. 28, 1914.

1,276,640.

Patented Aug. 20, 1918.
12 SHEETS—SHEET 11.

Fig. 20.

UNITED STATES PATENT OFFICE.

FARREL THOMAS GALLAGHER, OF HERBERT'S CREEK, QUEENSLAND, AUSTRALIA.

AUTOMATIC QUICK-ACTING AIR-BRAKE.

1,276,640.  Specification of Letters Patent.  Patented Aug. 20, 1918.

Application filed February 28, 1914. Serial No. 821,697.

*To all whom it may concern:*

Be it known that I, FARREL THOMAS GALLAGHER, a subject of the King of Great Britain and Ireland, residing at Herbert's Creek, Central Railway, in the State of Queensland, Commonwealth of Australia, have invented certain new and useful Improvements in Automatic Quick-Acting Air-Brakes, of which the following is a specification.

This invention relates to automatic quick-acting brakes of the compressed air type, and is specially applicable to the Westinghouse brake, and is designed to effect certain improvements therein with the object of obviating the skidding of the train wheels when the brakes are applied.

These improvements comprise the arrangement, combination and operation of certain controlling valves, rods, cylinders, links and rods, the whole being operated automatically by governors actuated by the ordinary road wheels of the vehicle and by an extra set of unbraked wheels, the whole being so arranged that when the pressure in the train pipe is such that the pressure of the brakes causes the wheels to skid the said brake pressure is instantly released. The invention necessitates no alteration in the construction or manipulation of the engine-driver's regulating valve, and its operation is not affected by excessive air pressure in the train pipe, while with a low pressure therein the major portion of the mechanism is automatically thrown out of action.

The invention is best described with the aid of the accompanying drawings which illustrate diagrammatically an arrangement and details of construction of the various parts constituting the improvements referred to. I will now refer to these drawings in which.

Figure 1:
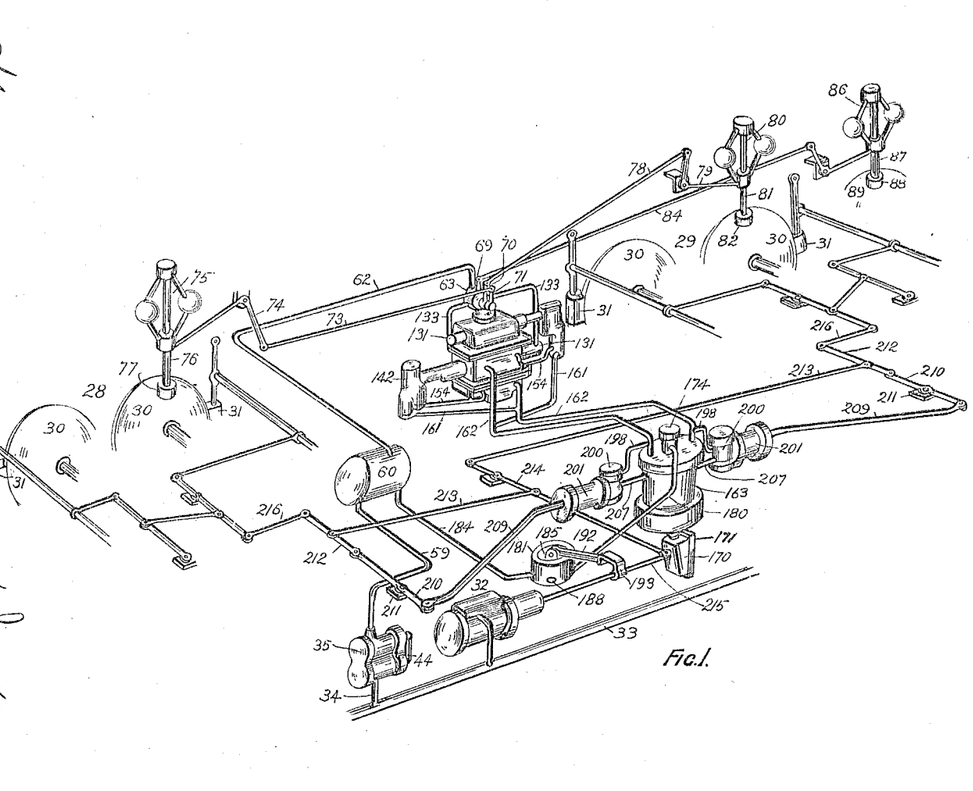
Figure 1 is a perspective view of this invention as applied to the ordinary Westinghouse brake gearing.
Figure 2:
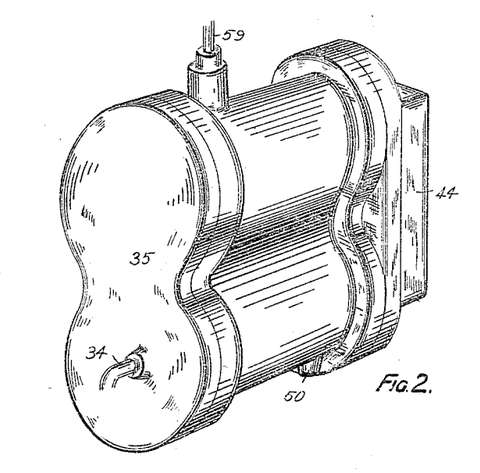
Fig. 2 is a perspective view of the governing valve.

Referring to Figs. 1, 18, 19, 20 and 21, the permanent way vehicle wheels 30 have brake shoes 31 and lever connections of ordinary construction controlled by a brake cylinder 32 connected in the usual manner to a brake pipe 33. From this brake pipe branches a pipe 34 connected to a governing valve 35 (see Figs. 2, 3 and 4) consisting of double cylindrical casing having two cylindrical compartments 36 and 37 for pistons 38 and 39 respectively, the compartments being connected by a passage 40. The piston 38 has a ramp rod 41 adapted to pass through an orifice 42 leading into a chamber 43 of valve chamber 44, the said chamber 43 being connected by a passage 45 having a check valve 46 to another chamber 47. This valve 46 is adapted to be raised from its seating when the ramp rod 41 engages therewith (see dotted lines, Fig. 3); the chamber 47 is also connected by a passage 48 to the compartment 37 of the governing valve 35.

Figure 3:
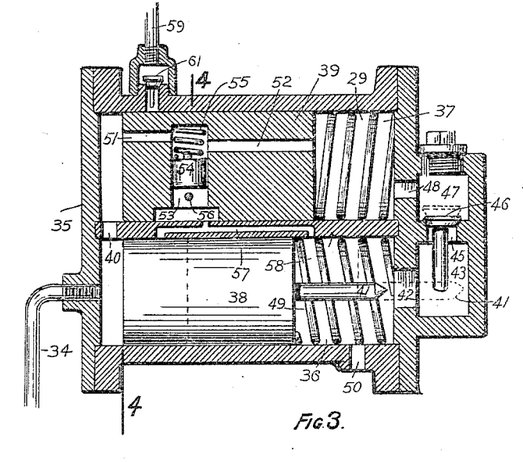
Fig. 3 is a central longitudinal section thereof.
Figure 4:
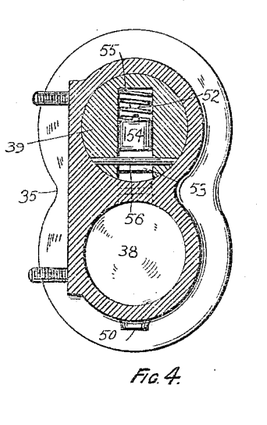
Fig. 4 is a cross-section on line 4—4 of Fig. 3.
Figure 5:
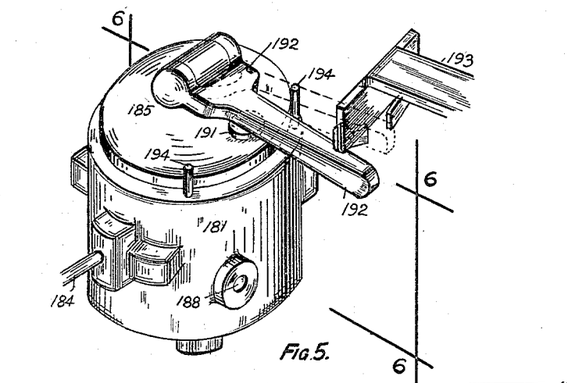
Fig. 5 is a perspective view of the control valve and projection attached to the piston rod of the brake cylinder.
Figure 6:
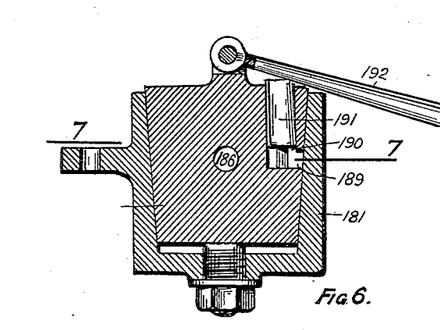
Fig. 6 is a sectional elevation on plane 6—6 of Fig. 5.
Figure 7:
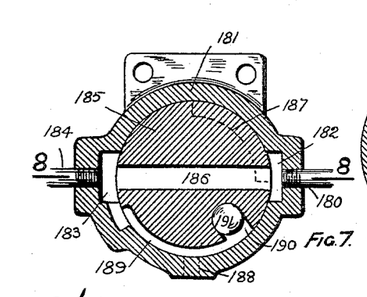
Fig. 7 is a sectional plan on line 7—7 of Fig. 6.
Figure 8:
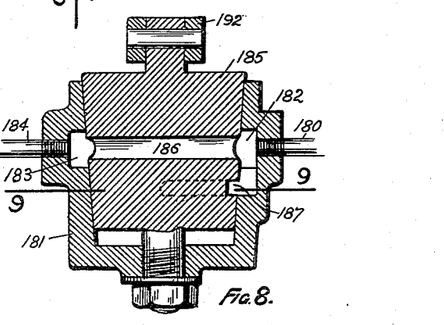
Fig. 8 is a sectional elevation on line 8—8 of Fig. 7.
Figure 9:
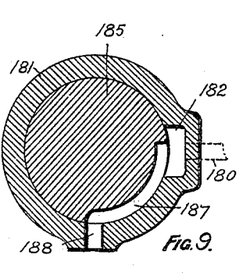
Fig. 9 is a sectional plan on line 9—9 of Fig. 8.

The compartment 36 has an inlet supply pipe 34 from the brake pipe 33, an air exhaust port 50, and also a coil spring 49 so tensioned that when the air pressure entering compartment 36 from pipe 34 has almost reached skidding pressure, the piston 38 has moved against a spring 49 sufficiently to uncover one end of the port passage 57 and closes the other end, thus admitting the pressure to the underside of piston valve 54. The piston 39 of compartment 37 has also a coil spring 29 and two port passages 51 and 52 not in the same straight line and separated by a cylindrical valve passage 53 in which is a piston 54 with a coil spring 55. The piston valve 54, when sufficiently moved against spring 55 by air pressure in valve passage 53, cuts off the communication between the port passages 51 and 52. The pin 56 limits the movement downwardly of the piston valve 54, and the valve passage 53 is connected to a port passage 57 in the partition 58 between the two compartments 36 and 37.

From this governing valve leads a pipe 59 to the auxiliary air reservoir 60, and a check valve 61 is fitted in the said pipe 59.

Figure 16:
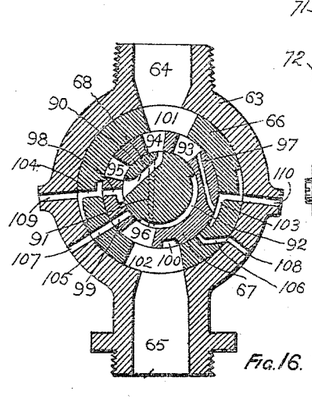
Figs. 16 and 17 are sectional elevations in planes 16—16 and 17—17 respectively, of Fig. 15.
Figure 17:
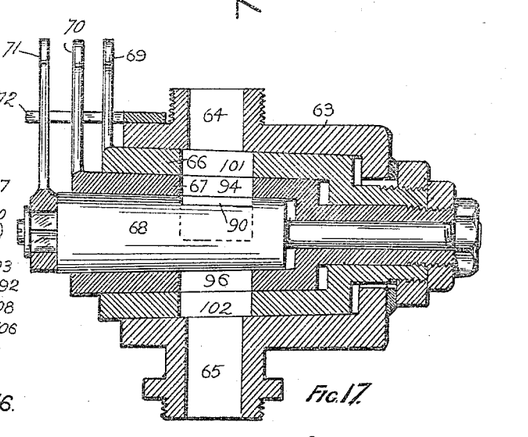
Figure 18:
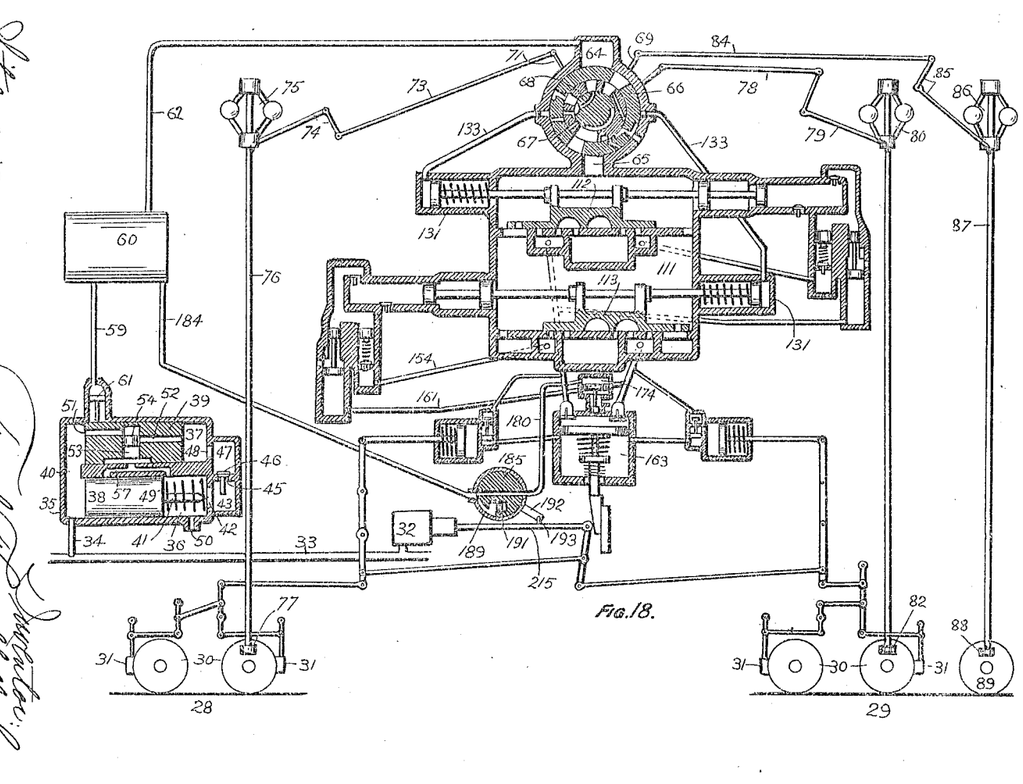
Figs. 18, 19, 20 and 21 are sectional diagrammatic views of Fig. 1.
Figure 19:
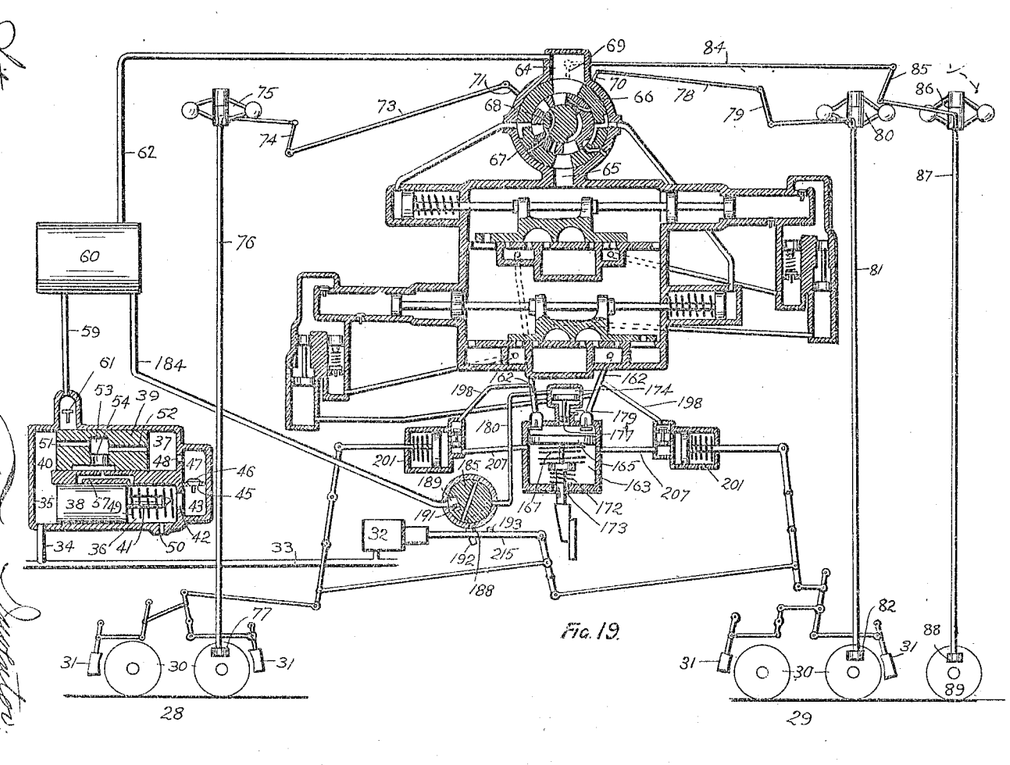
Figure 20:
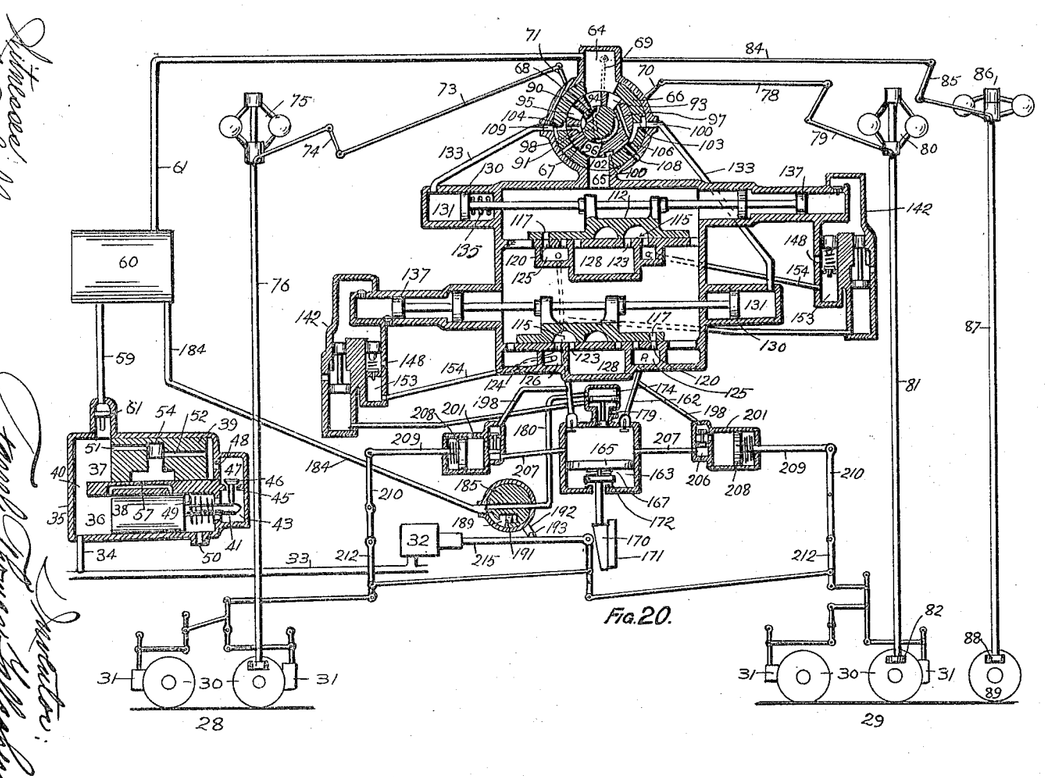
Figure 21:
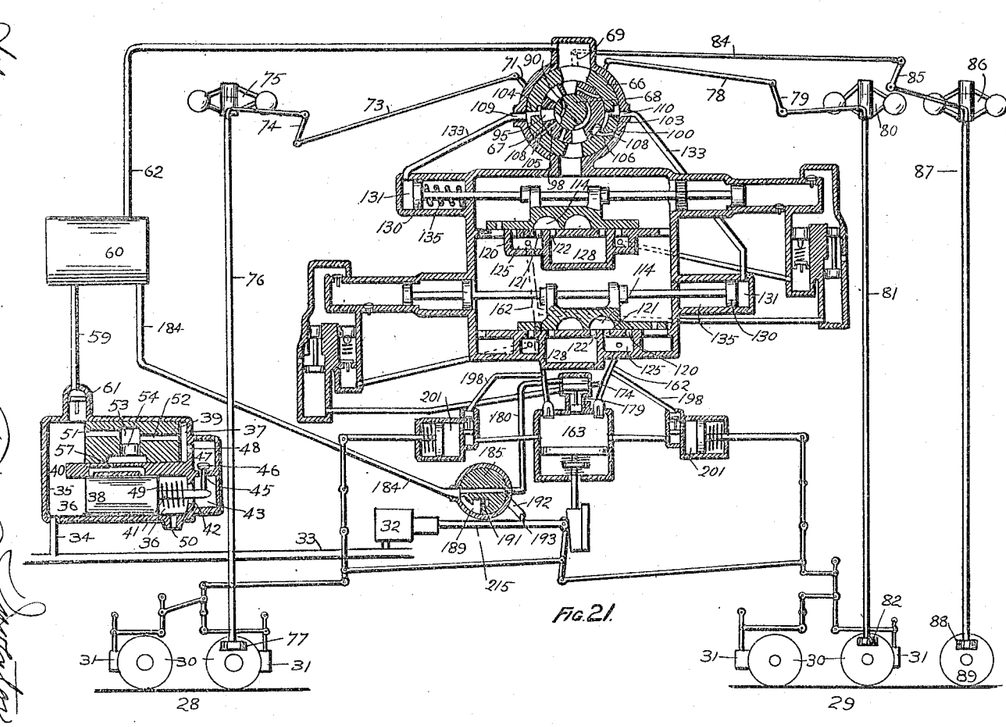

From this auxiliary reservoir 60 a pipe 62 leads to a triple plug valve (see Figs. 15, 16 and 17) consisting of an outside casing 63 having ports 64 and 65. Within the casing 63 are three concentric plug taps 66, 67 and 68, the two former being annular while the latter 68 is a ported solid plug. The three plugs 66, 67 and 68 have each a lever 69, 70 and 71 respectively, the circumferential travel of which is limited by the sector stop-piece 72. The lever 71 is connected by a rod 73 to a bell crank 74 operated by a governor 75 which is set in motion by the rod 76 and friction wheel 77 gearing with a wheel 30, of the bogie 28. The lever 70 is connected by a link 78 to a bell crank 79 operated by the governor 80, which receives its motion from a rod 81 rotated by a friction wheel 82 gearing with a wheel 30 of bogie 29. The lever 69 is connected by a link 84 and bell crank 85 to a governor 86 operated by rod 87 of a friction wheel 88 gearing with a pair of wheels 89 that have no brake shoes. These wheels 89 are an additional set on a permanent way carriage, whereas in the case of a locomotive the leading bogie or any other wheels that are free of brake shoes may be used. The plug 68 has air port passages 90, 91 and 92, also plug 67 has ports 93, 94, 95 and 96, the port 93 communicating with a passage 97, also in said plug are port passages 98 and 99 and recess port 100. The plug 66 has two ports 101 and 102 and zig-zag port passages 103 and 104, and two other port passages 105 and 106.

Figure 13:
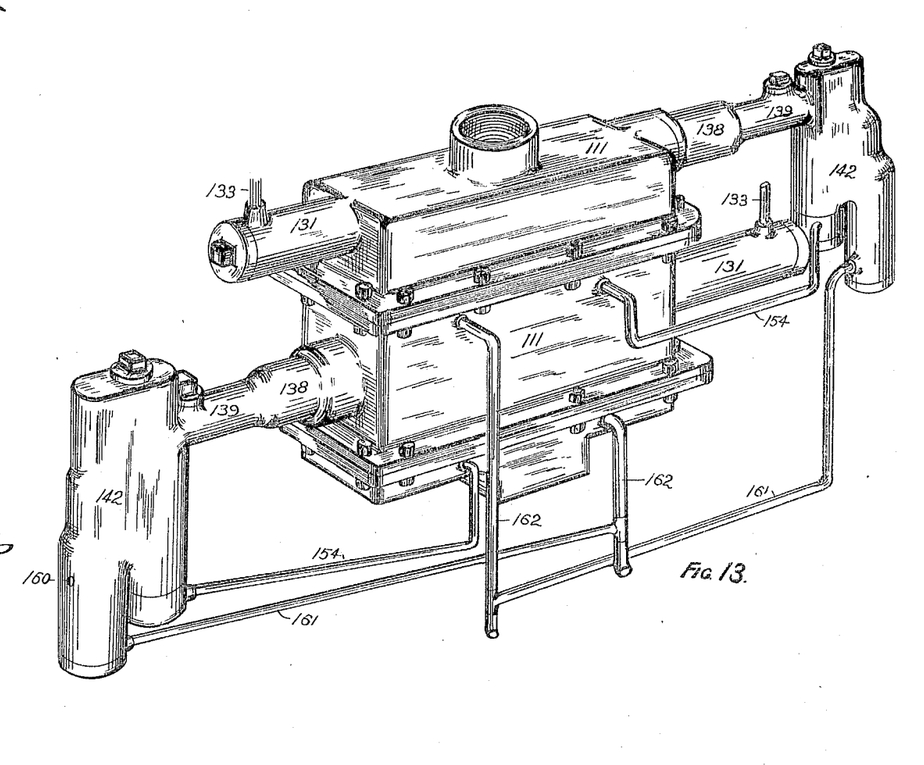
Fig. 13 is a perspective view of the valve chest and exhaust controllers.
Figure 14:
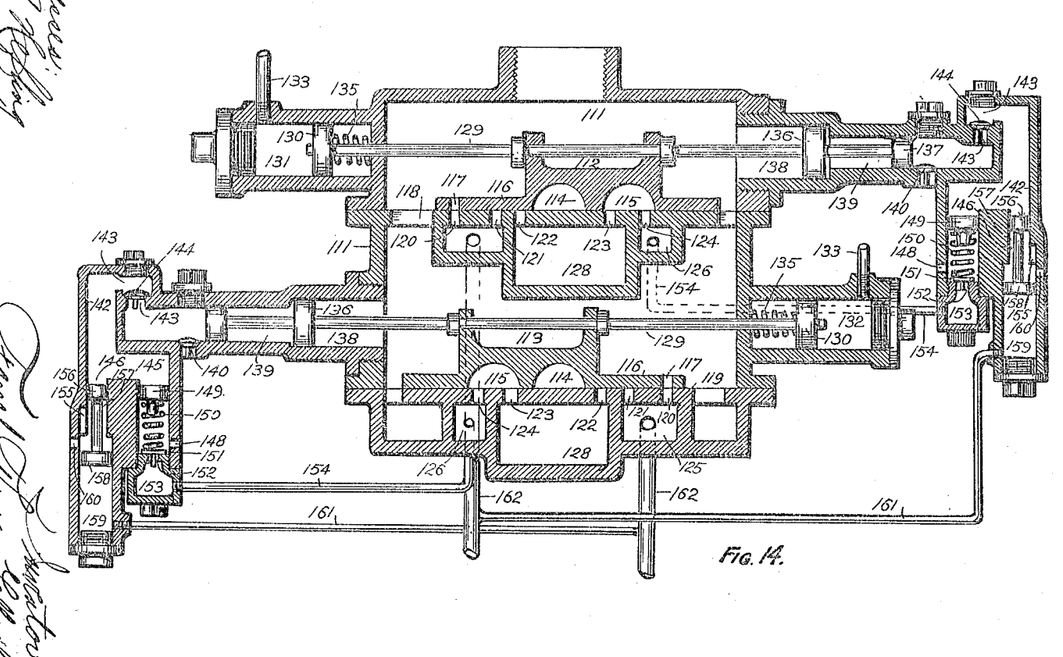
Fig. 14 is a central longitudinal sectional elevation thereof.
Figure 15:
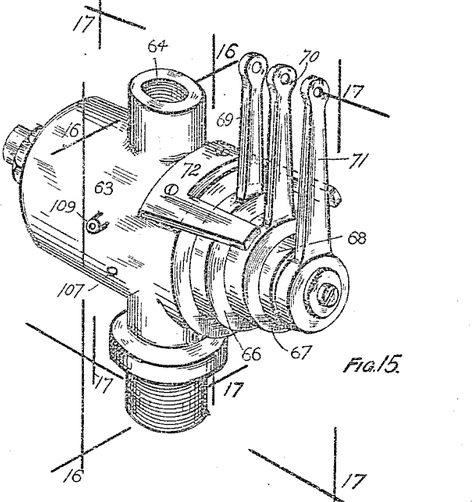
Fig. 15 is a perspective view of the triple plug valve.

The casing 63 has two air exhaust ports 107 and 108 and two air inlet passages 109 and 110, and is secured to a valve chest 111 (see Figs. 13 and 14).

This valve chest 111 is rectangular in shape and has contained therein two sets of slide valves 112 and 113, each having double D-recesses 114 and 115 and lap 116 with a port 117. These slide valves 112 and 113 are adapted to be reciprocated on the face plates 118 and 119, each having ports 120, 121, 122, 123 and 124, the two former (120 and 121) leading into a chamber 125, and the port 124 into a chamber 126, while the two ports 122 and 123 lead into a reservoir 128. The said chambers 125 and 126 and reservoir 128 are integral with their respective face plates.

The valves 112 and 113 have rods 129 and pistons 130 thereon working in cylinders 131 and 132 respectively, and which are integral with the valve chest and connected by pipes 133 to the ports 109 and 110 of the triple plug valve casing hereinbefore mentioned. In the cylinders 131 and 132 are coil springs 135. The valve rods 129 have also affixed at the other ends pistons 136 and 137 in cylinders 138 and 139 respectively.

Each of these cylinders 139 has an air inlet valve 140 and a passage 143 with a check valve 144 leading to a valve casing 142 having two cylindrical chambers 145 and 146. These valve casings 142 are integral with cylinders 139. The cylindrical chamber 145 of the valve casing 142 has a piston 149 and a coil spring 150 abutting against a check valve 151, and a passage 152 leading into a chamber 153 and provided with an exhaust port 148. The chambers 153 are connected by pipes 154 to chambers 126 of the face plates 118 and 119.

The cylindrical chamber 146 of each casing 142 has a drain passage 155 and a piston valve 156 connected by a rod 157 to a piston 158 in an enlarged cylindrical chamber 159 integral with the cylindrical chamber 145 and which has an exhaust port 160.

Figure 12:
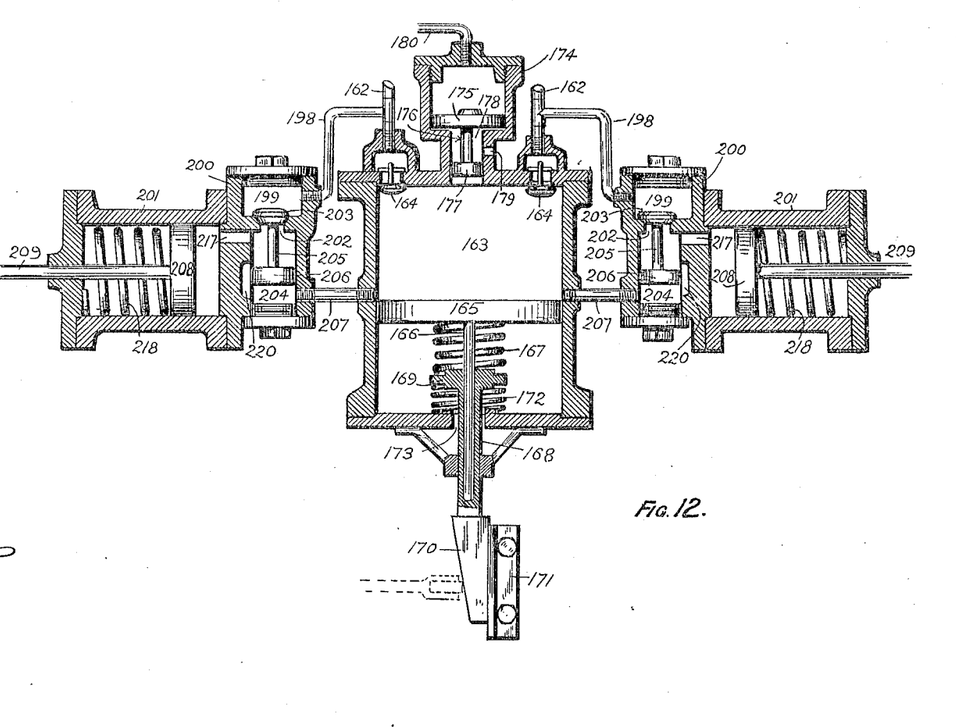
Fig. 12 is a longitudinal sectional elevation of Fig. 11.

From the chambers 159 are pipes 161 connected to pipes 162 that connect the chambers 125 of the face plates 118 and 119 respectively, to the abutment cylinder 163 and have spring check valves 164 (see Fig. 12).

This cylinder 163 has a piston 165 acting also as a valve, and having a plunger rod 166 surrounded by a coil spring 167, and said plunger rod 166 telescoping another rod 168 having a head piece 169 against which one end of the spring 167 bears, and at its lower end a wedge-shaped liner 170 taking against a fixed abutment 171 affixed to the vehicle framing. A coil spring 172, weaker than the coil spring 167, surrounds rod 168 and an exhaust port 173 is provided in the cylinder 163. The object of this wedge-shaped liner 170 is to make up the difference of the wear and tear on the brake shoes and thus insure the end of the piston rod of the brake cylinder 32 abutting when required as hereinafter explained.

On the top of this abutment cylinder 163 is an exhaust control valve chamber 174 having a piston 175 connected by a stem 176 to a piston valve 177 in passage 178 which has an exhaust port 179. From the top of the valve chamber 174 is a pipe 180 connected to a control valve 181 (see Figs. 5 to 9).

Figure 10:
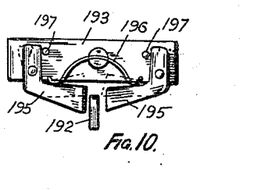
Fig. 10 is an elevation view of the projection on the brake cylinder push rod.

The control valve 181 is a cylindrical casing and has recesses 182 and 183, the former (182) being connected to the pipe 180 from the exhaust control valve 174, and the latter (183) by a pipe 184 connected to the auxiliary reservoir 60. Within this casing 181 is a valve plug 185 having a through-passage 186 adapted to make connection between the recesses 182 and 183, and a by-pass passage 187 is provided adapted to make connection between the recess 182 and an exhaust port 188. The recess 183 is also adapted to be connected by a passage 189 to a cylindrical chamber 190 having a piston 191 adapted to operate the handle 192 pivoted to the plug 185. This handle 192 is adapted to be thrown in and out of gear with the projection 193 rigidly affixed to the push rod of the brake cylinder 32 according to the pressure in the train pipe, and is limited in its circumferential movement by the stop pins 194. The projection 193 has spring tripping lugs 195 (see Fig. 10) controlled by spring 196 and stop pins 197.

Figure 11:
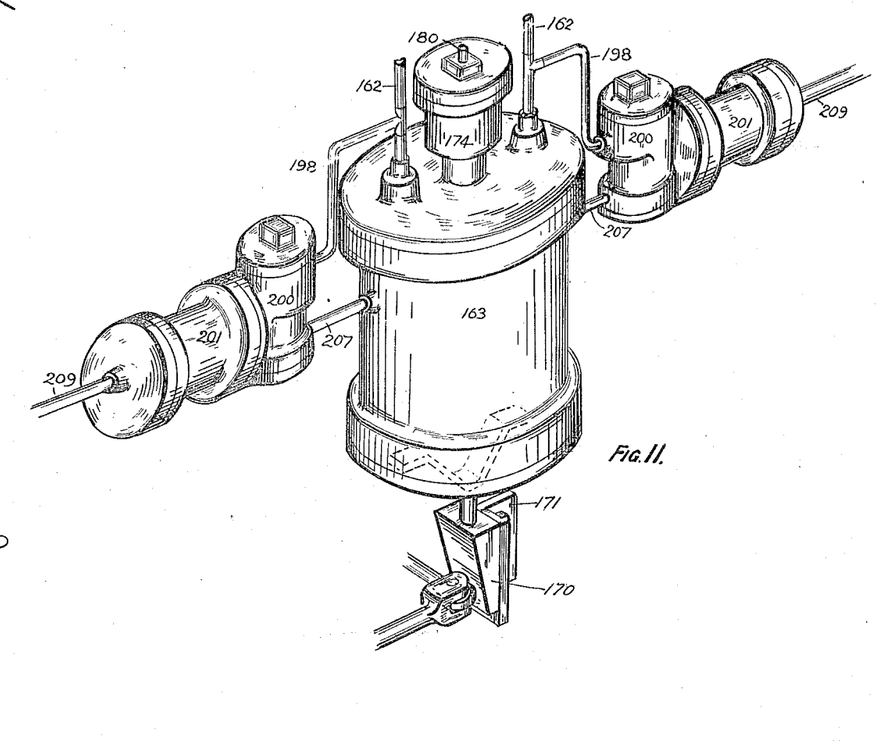
Fig. 11 is a perspective view of the abutment cylinder and brake easing cylinders.

Referring again to Figs. 11 and 12, branching from the pipe 162 are pipes 198 connected to valve chambers 199 of valve casings 200 that are attached to the brake easing cylinders 201. The valve chamber 199 of each valve casing 200 is connected by passage 202, provided with a check valve 203, to a cylindrical chamber 204.

The check valve is connected to a stem 205 of a piston 206, and the chambers 204 are connected by pipe 207 to the abutment cylinders 163. The brake easing cylinders 201 have pistons 208 and piston push rods 209 each connected to a double ended lever 210 (see Fig. 1) fulcrumed at 211 and pivotally connected to a radial arm 212 connected to the pull rods 213 which are pivoted to a double ended lever 214 connected to the piston rod 215 of the brake cylinder 32. From the radial arms 212 are connecting links 216 to the usual brake levers of the brake shoes 31 of wheels 30. The brake easing cylinders 201 have each a connecting port passage 217 to the chambers 204 and a coil spring 218.

In operation, when the brakes are applied and before the train pipe pressure has caused the brakes to bear sufficiently hard to hold the wheels and cause them to skid, the piston 38 of the governing valve 35 (see Figs. 3 and 20) will be forced into the position shown in dotted lines (Fig. 3), and compress the coil spring 49 and lift the valve 46 by the ramp rod 41 so that the chamber 47 will be open to the exhaust port 50. The air from the brake pipe will then pass through the passage 57 into the cylinder 53 and raise the piston-valve 54 so as to cut off communication between the port passages 51 and 52, thereby preventing air getting to the rear of the piston 39 which is then forced back by the air entering through port 40 until air can pass up the pipe 59 into the auxiliary reservoir 60 (see Fig. 20). From the reservoir 60 air will pass down pipe 184 into the recess 183 (Fig. 7) of the control valve 181, thence by passage 189 into the cylinder 190 and raise the piston 191 so as to lift the handle 192 into engagement with the projection 193 on brake rod 215. The said rod has a greater travel than the handle 192 and consequently before the projection 193 has reached the engagement point the handle 192 will have been raised. Further movement of the brake cylinder rod 215 will operate the valve plug 185 and make connection between the recesses 183 and 182 by the passage 186, thereby allowing the air from pipe 184 to pass into pipe 180 to the exhaust control 174. The piston 175 in the exhaust control valve 174 is thereby pressed down so that the piston valve 177 will cut off the exhaust port 179 of the abutment cylinder 163. It is to be noted that air from the auxiliary reservoir 60 (when charged as before stated) operates piston 191 (Fig. 6) to raise handle 192 into the engagement position, so that on advance of the brake cylinder rod 215 the lug 193 thereon engages said handle and rotates the valve plug 185. The cylinder 190 is in constant communication with the auxiliary reservoir 60 and on retraction of the rod 215 the handle 192 and plug 185 are carried back to normal position. Consequently the handle 192 is kept in the raised position as long as there is sufficient pressure in the reservoir 60. This pressure is reduced gradually by escape of the air through pipe 62, but as very little pressure is required to operate piston 191 the pressure in reservoir 60 may be very greatly reduced before the handle 192 falls.

The piston 165 of the abutment cylinder 163 being above the ports of pipes 207 by virtue of the coil springs 167 and 172, the abutment cylinder 163 is ready to receive its supply of air from the auxiliary reservoir 60 by the way of the triple plug valve 63 through ports 64 and 101, the port 101 being, when the wheels are rotating, placed in such position (see Fig. 20) by the governor 86 and connecting link 84 and bell crank 85 operating the lever 69 of plug 66, by reason of the fact that the governor 86 is driven from unbraked wheel 89 and is, therefore, not lowered when the braked wheels skid. At the same time governors 75 and 80, being driven from braked wheels assume a lowered position when these wheels skid, and by so doing effect rotation of plugs 67 and 68, so that communication is established between ports 101 and 102 through port 94 and passage 91 of plug 68 and port 96 of plug 67. The air thus passes from port 101 through ports 96 and 102, thence into the valve chest 111.

Simultaneously as the air is passing into valve chest 111, air will pass from port 94 through passages 90, 98, 104 and 109, also by port 93, passages 97, 103 and 110 to pipes 133 and cylinders 131, all these said ports and passages being placed in such positions by virtue of the governors 75 and 80 being brought to a standstill by wheels 30 skidding. The pistons 130 operate the slide valves 112 and 113 until the ports 117 and 120 are in juxtaposition to one another, thus allowing air to enter from the valve chest into the chambers 125 by pipes 162 to the abutment cylinder 163, thus forcing the piston 165 down until the ports of pipes 207 are uncovered, and through the medium of the coil springs 167 and 172 the wedge-shaped liner 170 is forced between the rigid abutment 171 and the end of the brake cylinder push rod 215, and serves to limit the movement of the push rod 215.

Air in the abutment cylinder 163 will then pass into the pipes 207 to chambers 204 and operate the pistons 206 which lift the valves 203 in order to open the passages 202 to chambers 199 connecting the pipes 198 to brake easing cylinders 201. Air will then pass from pipes 162 into pipes 198, chambers 199, passages 202, chambers 204, ports 217 into the brake casing cylinder 201.

The push rods 209 of pistons 208 operate on levers 210 and the arms 212 tend to force the rods 213 in the opposite direction, but by reason of the lever 214 bearing against the wedge-shaped liner 170 the arrangement of levers and links operates to ease the pressure. And when the governors 75 and 80 revolve again, the valve plugs 67 and 68 are operated so that pipes 133 will be connected to air exhaust ports 107 and 108 (see Fig. 21), the passage from one pipe 133 being continued through the ports 109, 104 and 95 and recess in the passage 90 leading into the passages 98 and 105 to air exhaust port 107; and the passage from the other pipe 133 being through ports 110, 103, recess 100, passage 106 to exhaust port 108. The cylinders 131 being exhausted, the pistons 130 are returned by the coil springs 135, and the slide valves 112 and 113 cover the ports 120 in both face plates 118 and 119 and at the same time connect the ports 121 and 122 by the D-recesses 114, so that air from the brake easing cylinders 201 passes through pipes 198 and 162 into chambers 125 and reservoirs 128, thus increasing the pressure on the brake shoes 31, which is necessary when the wheels are again revolving. The air pressure in the reservoir 128 is exhausted when the pistons 130 are operated to move the slide valves 112 and 113 so that communication is established between the ports 123 and 124, said air pressure exhausting into chambers 126, pipes 154, chambers 153, through valve openings 152 and exhaust ports 148.

When the driver releases the brakes (see Fig. 19), then the brake cylinder push rod 215 operates the control valve 181, so that the air in the exhaust control valve 174 will exhaust out by the port 188 of control valve 181, the air from the exhaust control valve 174 escaping by pipe 180 into recess 182, passage 187 to exhaust port 188, which allows the piston valve 177 to lift until the air exhaust port 179 is uncovered; thus allowing air from abutment cylinder 163 and from pipes 162 and 198 also from the brake easing cylinders 201 to escape, and as the air escapes from the abutment cylinder 163 the piston 165 is raised by the coil springs 167 and 172, and when above the ports of pipes 207, the valves 203 will close the passage 202 between the chambers 199 and 204 and then the remaining air in the brake easing cylinders 201 will pass through the drains 220 (see Fig. 12) into the chambers 204, thence by pipes 207 into the abutment cylinder 163 below the piston 165, thence out by the orifice 173 to the atmosphere.

The governing valve 35 will also shut off the connection between the auxiliary reservoir 60 and brake pipe 33 as soon as the pressure in the train pipe falls approximately below skidding pressure. This is accomplished by the spring 49 forcing the piston 38 out, not closing port 40, but closing the port passage 57 at one end and opening it at the other end to the exhaust port 50. This allows the piston valve 54 to fall and open communication between the passages 51 and 52, and at the same time air enters the passages 51 and 52 and equalizes on both sides of the piston 39. The coil spring 29 then forces out the said piston and closes the communication between the pipe 34 and train pipe 33 and pipe 59 leading to the auxiliary reservoir 60.

When there is a low train pipe pressure the reservoir 60 is automatically cut out by the governing valve 35 as just described. The governors operate the triple plug valve enabling the pressure in said reservoir 60 to exhaust through pipe 62, chamber 64, ports 101 and 94 and the exhaust port 105, the passage 90 in the central plug 68 placing in communication ports 94 and 99, the latter registering with port 105. This occurs when the governors 75, 80 and 86 are in normal running position. At the same time, to avoid the control valve 181 being automatically operated when there is no pressure in the auxiliary reservoir 60, the air in cylinder 190 exhausts back into and through reservoir 60 so that the piston 191 lowers and disengages the handle 192 from the projection 193 on the brake cylinder push rod 215.

When a wheel skids and the triple plug valve 63 is operated by the action of the governors to ease the pressure on the brake rods, the skidding wheel revolves again. The operation of the triple plug valve would let all the pressure escape from cylinders 201 and the pistons thereof return to their normal position, so that the excess strain being still in the brake equipment would operate to skid the wheels again unless regulated or controlled. To prevent such action regulator valves are provided to prevent reduction of the pressure in cylinders 201 below a certain point, and these regulator valves are constituted by the valve 151 controlled by the pressure acting upon pistons 149. The valve rods 129 being continually reciprocated through sudden rising and falling of pressure will, by means of the pistons 137 and cylinders 139 acting as pumps, draw air in through the valves 140 and force said air through valves 143 into the chambers 142. The air compressed in chambers 142 controls the exhausting of chambers 128 by pressing against the pistons 156, but cannot move them as the larger pistons 158 have pressure on them from the pipes 161, and at the same time the pressure on the valve 151 is increased by the piston 149 and springs 150, thus preventing the reservoirs 128 from discharging too much of their pressure when the pressure in chambers 159 falls sufficiently to allow pistons 158 being depressed by pistons 156, the air from chambers 142 then exhausting through drains 155 and ports 160 and releasing the pressure on pistons 149 so that valves 151 may lift as required to permit discharge from chambers 128 by the way of ports 123 and 124 and recesses 115 of slide valves 112 and 113, chambers 126, pipes 154 into chambers 153, passages 152, exhaust ports 148 (see Figs. 14 and 20).

When the train is at a standstill the governors 75, 80 and 86 will all fall, thus operating the levers 69, 70 and 71 of triple plug valve 63. The governor 86 in its action moving the plug 66 shuts off all connection between the auxiliary reservoir 60 and valve chest 111.

The reservoir 60 is of course constructed large enough in proportion to cylinders, chambers, and the like to supply air therefor. When the skidding wheels are relieved they cannot skid again under the same application of the brake, as the wedge-shaped liner prevents that. Renewed skidding can occur only when a fresh application of the brakes is made, and to do this the brakes must be first released. This, however, entails recharging of the auxiliary reservoir 60.

What I claim and desire to secure by Letters Patent is:—

1. Improvements in automatic air brakes for preventing the skidding of wheels when brakes are applied thereto, including an auxiliary air reservoir, a brake pipe, a governing valve controlling the communication between said brake pipe and said reservoir, a valve chest including slide valves and exhaust controlling valves, governors, a valve operated by said governors and controlling communication between said auxiliary reservoir and said valve chest, an abutment cylinder connected to said valve chest and adapted to limit the movement of the brake piston, brake easing cylinders connected to the brakes, and a control tap operated by the brake piston to establish communication between said brake easing cylinders and said valve chest.

2. In apparatus for preventing the skidding of wheels when air brakes are applied thereto, brake easing cylinders connected to the brakes, an auxiliary reservoir connected to said brake easing cylinders, a brake pipe, a governing valve connected to said brake pipe and to said auxiliary air reservoir, said governing valve being provided with double cylindrical chambers and with an exhaust for one of said chambers, a valve controlling the communication of said chambers, pistons arranged in said chambers, one of said pistons having a ramp rod adapted to actuate said last named valve, and a coil spring for normally maintaining said valve actuating piston in inoperative position.

3. In apparatus for preventing the skidding of wheels when air brakes are applied thereto, brake easing cylinders connected to the brakes, an auxiliary reservoir connected to said brake easing cylinders, a brake pipe, a governing valve between said brake pipe and said auxiliary air reservoir, said governing valve being provided with double cylindrical chambers and with an exhaust for one of said chambers, a valve controlling the communication of said chambers, pistons arranged in said chambers, one of said pistons having a ramp rod adapted to actuate said valve, and a coil spring tensioned almost to skidding pressure for normally maintaining said valve actuating piston in inoperative position.

4. In apparatus for preventing the skidding of wheels when air brakes are applied thereto, brake easing cylinders connected to the brakes, an auxiliary reservoir connected to said brake easing cylinders, a brake pipe, a governing valve connected to said brake pipe and to said auxiliary air reservoir, said governing valve being provided with double cylindrical chambers and an exhaust for one of said chambers, a valve controlling the communication of said chambers, pistons in said chambers, one of said pistons being adapted to actuate said valve, the other of said pistons being provided with disalined port passages, and a piston valve interposed between said disalined port passages and adapted to establish and interrupt communication between said port passages.

5. In apparatus for preventing the skidding of wheels when air brakes are applied thereto, a brake pipe, brake easing cylinders connected to the brakes, and a control valve operated by a projection affixed to the brake cylinder push rod and adapted to establish communication between said brake easing cylinders and said brake pipe.

6. In apparatus for preventing the skidding of wheels when air brakes are applied thereto, a brake pipe, brake easing cylinders connected to the brakes, a control valve adapted to establish communication between said brake easing cylinders and said brake pipe, said control valve having a plug tap equipped with a pivoted handle and a stop pin, and spring lugs on a projection from the brake cylinder push rod and adapted to engage said handle.

7. In apparatus for preventing the skidding of wheels when air brakes are applied thereto, a brake pipe, brake easing cylinders connected to the brakes, a control valve adapted to establish communication between said brake easing cylinders and said brake pipe, said control valve having a plug with a pivoted handle, a cylinder formed in said plug, and a piston arranged in said cylinder adapted to raise and lower said handle, said cylinder being connected to said brake pipe.

8. In apparatus for preventing the skidding of wheels when air brakes are applied thereto, a brake pipe, brake easing cylinders connected to the brakes, a control valve operated by a projection affixed to the brake cylinder push rod and adapted to establish communication between said brake easing cylinders and said brake pipe, and an exhaust control valve adapted to establish atmospheric connection with said brake easing cylinders.

9. In apparatus for preventing the skidding of wheels when air brakes are applied thereto, a brake pipe, an exhaust control valve, a triple plug valve controlling the communication from said brake pipe to said exhaust control valve, and brake easing cylinders connected to the brakes and to the valve chest of said exhaust control valve.

10. In apparatus for preventing the skidding of wheels when air brakes are applied thereto, a brake pipe, brake easing cylinders connected to the brakes, and a triple plug valve controlling the communication between said brake pipe and said brake easing cylinders, said valve comprising three plugs in telescoping arrangement and provided with port passages, and automatically controlled operating levers secured to said plugs.

11. In apparatus for preventing the skidding of wheels when air brakes are applied thereto, a brake pipe, brake easing cylinders connected to the brakes, a triple plug valve controlling the communication between said brake pipe and said brake easing cylinders, levers connected to the plugs of said valve, governors geared to main vehicle wheels, and links and bell cranks connecting said governors to said levers.

12. In apparatus for preventing the skidding of wheels when air brakes are applied thereto, a brake pipe, an auxiliary reservoir connected to said brake pipe, brake easing cylinders connected to the brakes, a triple plug valve controlling communication between said reservoir and said cylinders, a valve chest inserted between said cylinders and said plug valve, said plug valve having a plug adapted to cut off the air supply from said reservoir to said valve chest, and a governor actuated by wheels free of brake shoes controlling said plug.

13. In apparatus for preventing the skidding of wheels when air brakes are applied thereto, a brake pipe, an auxiliary reservoir connected to the brake pipe, brake easing cylinders connected to the brakes, a valve chest connected to said brake easing cylinders, and a triple plug valve having port passages to connect the auxiliary reservoir with the valve chest and additional port passages forming exhaust passages to air exhaust ports.

14. In apparatus for preventing the skidding of wheels when air brakes are applied thereto, a brake pipe, brake easing cylinders connected to the brakes, a triple plug valve connected to said brake pipe, an exhaust control valve interposed between said plug valve and said brake easing cylinders, said exhaust control valve having cylinders and pistons in said cylinders connected to the valve stems, and branch pipes connecting the plug valve to the cylinders of said exhaust control valve.

15. In apparatus for preventing the skidding of wheels when air brakes are applied thereto, a brake pipe, brake easing cylinders connected to the brakes, a triple plug valve having plugs establishing communication between said brake pipe and said cylinders, levers actuating said plugs, and a sector secured to the said valve and having stop pieces to limit the range of movement of said levers.

16. In apparatus for preventing the skidding of wheels when air brakes are applied thereto, a brake pipe, brake easing cylinders connected to the brakes, a triple plug valve connected to said brake pipe, a valve chest communicating with said brake easing cylinders and having a double set of slide valves and cylinders, pistons in the cylinders of said valve chest and connected to said slide valves, and supply pipes connecting said cylinders with said triple plug valve.

17. In apparatus for preventing the skidding of wheels when air brakes are applied thereto, a brake pipe, brake easing cylinders connected to the brakes, and an exhaust control valve controlling the communication between said brake pipe and said brake easing cylinders, said exhaust control valve including face plates, a double set of slide valves reciprocating on said face plates, pistons in said exhaust control valve connected by stems to said slide valves, and coil springs for maintaining said slide valves in normal position.

18. In apparatus for preventing the skidding of wheels when air brakes are applied thereto, a brake pipe, brake easing cylinders connected to the brakes, and an exhaust control valve controlling the communication between the brake pipe and said brake easing cylinders, said exhaust control valve including face plates, a double set of slide valves reciprocating on said plates, each of said slide valves having a lap with a port therein, and a double set of D-recesses registering with ports in said face plates.

19. In apparatus for preventing the skidding of wheels when air brakes are applied thereto, a brake pipe, brake easing cylinders connected to the brakes, and an exhaust control valve controlling the communication between said brake pipe and said brake easing cylinders, said exhaust control valve including a double set of face plates, each of said face plates having a double set of chambers for the air pressure and a reservoir for temporarily storing the air pressure, substantially as described.

20. In apparatus for preventing the skidding of wheels when air brakes are applied thereto, a brake pipe, brake easing cylinders connected to the brakes, and an exhaust control valve controlling the communication between the brake pipe and said brake easing cylinders and containing exhaust controlling chambers for said brake easing cylinders.

21. In apparatus for preventing the skidding of wheels when air brakes are applied thereto, a brake pipe, brake easing cylinders connected to the brakes, and an exhaust control valve controlling communication between said brake pipe and brake easing cylinders, said exhaust control valve including double cylinders, a spring-controlled valve in one of said valve cylinders, and a differential piston valve in the other of said valve cylinders.

22. In apparatus for preventing the skidding of wheels when air brakes are applied thereto, a brake pipe, brake easing cylinders connected to the brakes, an abutment cylinder adapted to limit the movement of the brake cylinder push rod, an exhaust control valve adapted to control communication between said brake pipe and said brake easing cylinders, said exhaust control valve including face plates formed with chambers, and valve-controlled pipes establishing communication between said chambers and said abutment cylinder.

23. In apparatus for preventing the skidding of wheels when air brakes are applied thereto, a brake pipe, brake easing cylinders connected to the brakes and adapted to be placed into communication with said brake pipe, and an abutment cylinder adapted to limit the outward movement of the brake cylinder push rod, said abutment cylinder including a piston, a second piston equipped with a wedge-shaped liner abutment and movably connected to said first named piston, and a fixed abutment against which said liner abutment bears.

24. In apparatus for preventing the skidding of wheels when air brakes are applied thereto, a brake pipe, brake easing cylinders connected to the brakes and adapted to be placed into communication with said brake pipe, an abutment cylinder provided with two pistons, coil springs surrounding the rods of said pistons, said abutment cylinder being provided with an exhaust port, and means for establishing communication between said brake easing cylinders and said exhaust port.

25. In apparatus for preventing the skidding of wheels when air brakes are applied thereto, a brake pipe, brake easing cylinders connected to the brakes, an abutment cylinder adapted to limit the outward movement of the brake cylinder push rod, means for establishing communication between said abutment cylinder and the brake pipe, an exhaust control valve connected to said abutment cylinder and provided with an air exhaust port, a piston in said exhaust control valve, and a piston valve attached to the stem of said first named piston and adapted to control said exhaust port.

26. In apparatus for preventing the skidding of wheels when air brakes are applied thereto, a brake pipe, brake easing cylinders connected to the brakes and adapted to be placed in communication with said brake pipe, an abutment cylinder adapted to limit the outward movement of the brake cylinder push rod, means for establishing communication between said abutment cylinder and said brake pipe, said brake easing cylinders being provided with valve chambers, said abutment cylinder being provided with ports, and means for establishing communication between said ports and said valve chambers.

27. In apparatus for preventing the skidding of wheels when air brakes are applied thereto, a brake pipe, a brake easing cylinder connected to said brake pipe, a piston in said cylinder, a coil spring for maintaining said piston in normal position, a double lever connected to the piston rod, and a radial arm connecting the said lever to the ordinary brake gear.

28. In apparatus for preventing the skidding of wheels when air brakes are applied thereto, a brake pipe, a brake easing cylinder connected to the brakes and to said brake pipe, said cylinder being provided with a valve chamber formed with two compartments, a check valve controlling the communication of said compartments, an abutment cylinder connected to said brake pipe and adapted to limit the outward movement of the brake piston, and an exhaust control valve for said abutment cylinder, one of said compartments being connected to said abutment cylinder and the other of said compartments being connected to said abutment cylinder and said exhaust control valve.

Signed at Rockhampton this third day of January, 1914.

FARREL THOMAS GALLAGHER.

Witnesses:
T. B. RENSHAW,
W. P. DEAN.

Copies of this patent may be obtained for five cents each, by addressing the "Commissioner of Patents, Washington, D. C."